July 25, 1933.  H. HUEBER  1,920,145
WIPER ARM AND MOUNTING THEREFOR
Filed Nov. 29, 1929  2 Sheets-Sheet 1
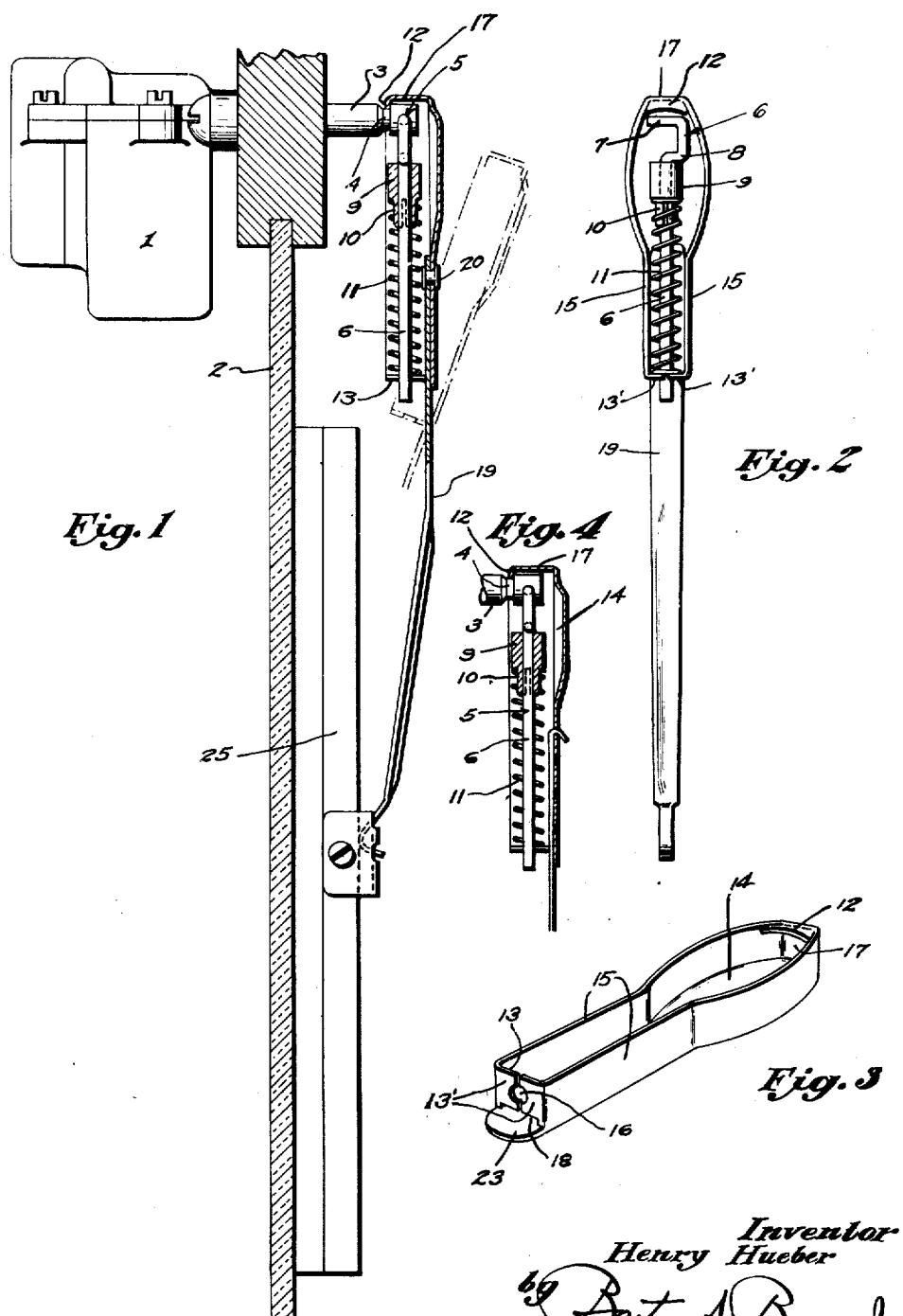
Inventor
Henry Hueber
by Barton A. Bean Jr
Attorney July 25, 1933.  H. HUEBER  1,920,145
WIPER ARM AND MOUNTING THEREFOR
Filed Nov. 29, 1929   2 Sheets-Sheet 2

Inventor
Henry Hueber
by Barton A. Bean
Attorney

Patented July 25, 1933

1,920,145

UNITED STATES PATENT OFFICE

HENRY HUEBER, OF BUFFALO, NEW YORK, ASSIGNOR TO TRICO PRODUCTS CORPORATION, OF BUFFALO, NEW YORK

WIPER ARM AND MOUNTING THEREFOR

Application filed November 29, 1929. Serial No. 410,801.

This invention relates to windshield cleaners and primarily to a wiper arm assembly or construction and its mounting. In my prior Patent No. 1,674,657 there is shown a wiper arm mounting in which the arm is detachably secured in place by a spring device acting in the added capacity of urging the wiper blade against the windshield glass under a predetermined and desired wiping pressure. Prior to the present invention attention has been chiefly applied to the features involving the utility of the windshield cleaner and particularly to the wiper arm. The present invention particularly improves the appearance for this part and in addition adds to its utility. The abandonment of the visor on many of the more expensive cars with the accompanying full exposure of the wiper arm has brought attention to the necessity of improvement of the wiper arm, solution of which is offered in this invention.

The present invention is an improvement on this prior patent and embodies the stirrup construction in the wiper arm make-up and utilizes a separate mounting for the spring, to provide a more finished appearance to the wiper arm mounting and at the same time provide a housing for the spring device embodied in said mounting. The invention also resides in a construction in which the spring device is readily placed under tension and by which the wiper arm connection with the actuating member or shaft of the windshield cleaner motor is greatly facilitated.

The invention further resides in the provision of locking means for the mounted wiper arm to prevent displacement thereof when the wiper is subjected to unusual strain due to ice or snow on the windshield.

The invention also resides in the provision of means by which the arm may be adjusted and varied in length for properly locating the wiper on the windshield glass.

Further the invention will be found to reside in the features of construction hereinafter set forth in detail, and the arrangements and combinations of parts defined in the appended claims, reference being now made to the accompanying drawings wherein Fig. 1 is a fragmentary sectional view through a windshield showing a windshield cleaner applied thereto which embodies the present invention.

Fig. 2 is a rear elevation of the wiper arm assembly.

Fig. 3 is a detail perspective view of the stirrup section of the wiper arm.

Fig. 4 is a fragmentary sectional view through the wiper arm depicting one mode of adjustment between the wiper arm sections.

Figure 5:
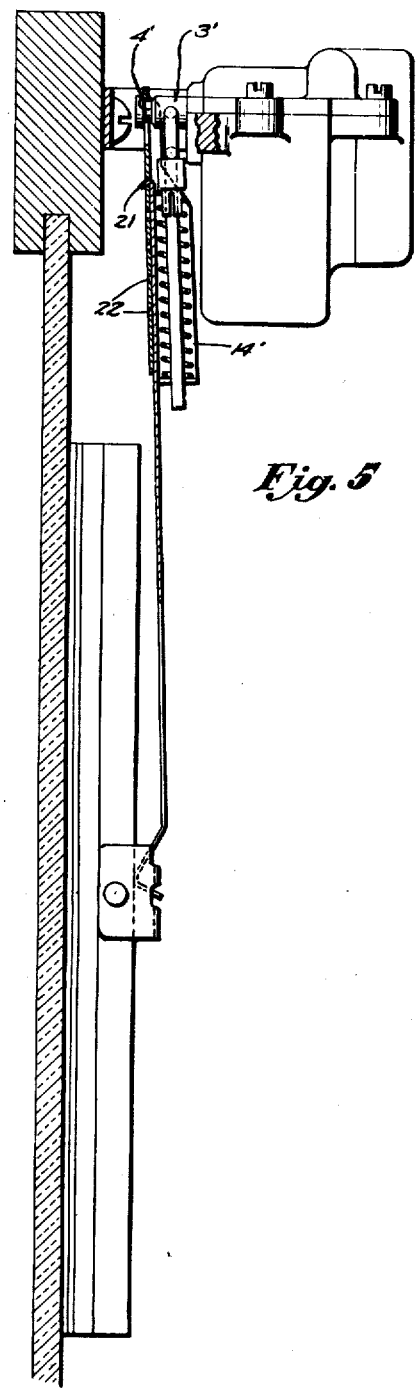
Fig. 5 is a view similar to Fig. 1 but showing an exteriorly mounted windshield cleaner with a correspondingly modified wiper arm construction.
Figure 6:
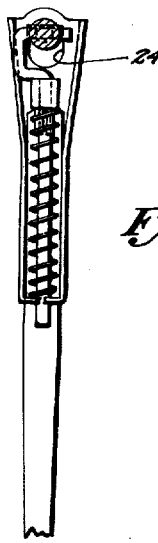
Fig. 6 is a vertical section through the motor shaft of Fig. 5 showing the wiper arm in front elevation.
Figure 7:
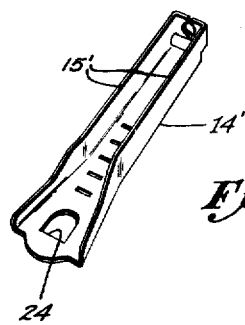
Fig. 7 is a detail perspective view of the stirrup section of the wiper arm depicted in Fig. 5.

In proceeding in accordance with the present invention, the windshield cleaner motor 1 in Fig. 1 is shown mounted at the interior side of the windshield 2 and has its forwardly projecting shaft 3 provided with a seat 4 and a bearing 5.

A spring device is engaged in the bearing 5 and in its preferred embodiment comprises a spring-carrying member or rod 6 having its upper end angularly deflected to constitute a pintle 7 which finds support in said bearing 5 whereby the rod 6 may swing in a plane perpendicular to the windshield glass. Adjacent the pintle 7 the rod 6 is given an offset bend to provide a shoulder 8 against which an anchor member or collar 9 may find support. This anchoring member is shown provided with a reduced slit portion 10 adapted to be embraced under tension by the upper end of the spring 11 whereby to provide a sufficient amount of friction to prevent displacement of the anchoring member from the rod 6 as well as displacement of the spring from the anchoring member, prior to the placement of the wiper carrying arm.

The wiper arm comprises a stirrup section and a wiper engaged section which may be integrally connected or adjustably, as desired. The stirrup member embodies a part 12 for connection to the actuating member 3 and a part 13 for constituting a seat for the free end of the spring 11, said seat being provided with an aperture or opening to guidingly receive the free end of the rod 6, whereby said rod functions substantially as a key to connect the stirrup member to the shaft 3 for movement therewith. It will be understood that the spring or resilient means, including spring 11 and collar 9, together with the rod 6, constitute a spring device acting between the shaft 3 and the lower end of the stirrup.

The stirrup section may be made from a separate piece of stock material, as shown in Fig. 3, and preferably comprises a stamping having a front wall 14, side walls 15 and a bottom wall formed by turning inwardly the extensions 13' of the side walls 15 so as to provide the spring seat 13. As shown in this figure the opposed edges of the extensions 13' are provided with supplemental recesses to form the opening 16 which guidingly receives the lower end of the key or spring carrying member 6. Side walls 15 merge to a top wall 17 from which depends the lip or part 12 which is designed for engaging in the seat 4. The inturned extensions 13' are cut away on their inner marginal portions to provide a slot 18 through which the wiper engaged or carrying section 19 extends. When this section is formed separately from the stirrup section, the inner end of said section 19 may be permanently secured to the stirrup section by means of a rivet 20, or it may terminate in a hook or detent 21 for selective engagement in a series of slots or recessss 22 in the housing 14. In either construction the walls of the slot 18 confine the upper end of the section 19, and additional support is given to said section by a depending lip 23. The opposite end of the section 19 is adapted to engage a wiper member in any suitable manner.

The stirrup housing completely conceals and encloses the spring device, the spring itself nesting between the side walls 15, so that the attachment or mounting of the arm on the actuating member or shaft 3 is not only given a neat appearance and finish but the spring itself is protected from the weather elements to a large degree. It has been found that upon rare occasions the formerly used spring means fail to hold such pintle and actuator assemblies due to unusual stress applied to the wiper member. The stirrup housing in covering the pintle and actuating assembly in close relation thereto acts as a positive lock therefor.

In the exterior mounting depicted in Fig. 5 the stirrup housing 14' is provided with an opening 24 for being passed over the shaft 3' and engaged in the seat 4'.

In attaching an arm to either style of windshield cleaner, the pintle 7 is inserted in its bearing 5, and then, as shown in the dotted lines in Fig. 1, the lower end of the spring carrying rod 6 is introduced into the opening 16 of the spring seat 13. Following this the wiper arm is shifted upwardly against the tension of the spring 11, thereby comprising the same prior to the engagement of the stirrup section in its seat 4 (4'). The spring thus being compressed and held under tension, the stirrup section is secured against displacement from the shaft 3 (3'), the pintle 7 secured against displacement from its bearing 5, and the wiper carrying section 19 yieldably urged against or toward the windshield glass so as to provide the desired contact between the wiper blade 25 and the windshield glass. Furthermore, the spring being nested between the side walls 15 (15') further insures against lateral displacement of the pintle 7 from the bearing 5. This assembly thus substantially forms a lock for the pintle 7 which cannot be displaced by the usual lateral stresses received in operation.

What is claimed is:

1. A wiper arm assembly comprising a wiper carrying arm having a stirrup section provided with a part for engagement with a wiper shaft, for mounting and supporting the arm thereon, a spring retaining part fixed on the arm, and a spring device having one end engaged with the shaft and its opposite end engaged with and held compressed by said retaining part in opposition to the first end of said device, said first part being disposed on the side of said shaft that is opposite to the spring retaining part whereby the spring device will act through the spring retaining part to hold said first part engaged with the shaft.

2. A windshield wiper arm assembly comprising a shaft having a bearing and an adjacent seat, a spring device including a member releasably engaging in said bearing and having a part extending therefrom and supporting a coil spring, a stirrup releasably engaged in said seat and having a spring seat for supporting the spring under compression, and a wiper carrying section carried by said stirrup, said wiper carrying section and said stirrup being removable as a unit from the shaft.

3. A windshield wiper arm assembly comprising a shaft having a bearing and a seat, a spring device having an element engaging in said bearing and a coil spring under compression suppported at one end by said element, a stirrup engaging said seat and having a part supporting the other end of said coil spring, said stirrup having side walls extending on opposite sides of the element and spring for preventing displacement of the latter, and means carried by the stirrup for attaching a wiper thereto.

4. In a windshield cleaner, a shaft having a transverse bearing, a spring means carrying rod element having an offset providing a shoulder and a pintle spaced from the shoulder, the latter engaging in said bearing, spring means on said rod element having one end bearing against said shoulder, a stirrup element engaged with said shaft and having a part supporting the opposite end of the spring means under compression, said rod element engaging the stirrup element whereby the latter will move with the shaft, and means carried by one of said elements for carrying a wiper blade.

5. In a windshield cleaner, a shaft having a transverse bearing, a rod element having a shoulder and a pintle, the latter engaging in said bearing, resilient means on said rod element having one end bearing against said shoulder, a stirrup element engaged with said shaft and having a part supporting the opposite end of said resilient means, said stirrup element having front and side walls enclosing said resilient means, and a wiper carrying arm section carried by one of said elements and removably connected thereto.

6. In a windshield cleaner, a wiper shaft having a transverse bearing, a rod having a pintle engaging in said bearing, spring means on said rod, means for holding the end of the spring means adjacent the pintle against movement toward said pintle, a stirrup member engaged with said shaft and having a part supporting the opposite end of the spring means under compression, said stirrup having side, front and bottom walls, said bottom wall being provided with a slot, and a wiper carrying arm section extending through the slot and having its inner end secured to said front wall of the stirrup, said wiper carrying arm section being held against lateral movement by portions of the bottom wall.

7. In a windshield cleaner, a shaft having a bearing, a rod engaging in said bearing, a spring mounted on said rod against displacement therefrom, a stirrup hung on said shaft and having a spring seat supporting the spring, said stirrup having a plurality of seats therein, and a wiper carrying arm section carried by the stirrup and having its inner end selectively engageable with any one of said plurality of seats.

8. A wiper arm mounting for windshield cleaners having a shaft provided with a bearing and a seat, a spring device engaged in said bearing and having a part under flexure, and a wiper carrying arm engaged in said seat and having a part engaging the flexed part of the spring device, said wiper carrying arm having means associated therewith for preventing displacement of the spring device from the bearing.

9. In a wiper arm mounting for windshield cleaners having a shaft provided with a bearing and a seat, an open elongated housing element provided with a front wall and side wall portions extending therefrom, the upper end of said housing element enclosing the end of said shaft and provided with engaging means for engaging said seat, a rod element mounted in said bearing and loosely extending downwardly through the lower end of said housing element whereby the said rod element connects the shaft to the said housing element for unitary action, and spring means within the housing element for maintaining said engaging means on said seat.

10. In a wiper arm mounting for windshield cleaners having a shaft provided with a bearing and a seat, a wiper carrying arm provided with engaging means for engaging the seat, a rod provided with a spring seat and detachably mounted at one end in said bearing and having its opposite end extending substantially parallel to the wiper carrying arm and slidably engaged therewith, whereby the rod connects the shaft and wiper carrying arm for movement as a unit, and spring means mounted about said rod and engaging the spring seat and a portion of the wiper carrying arm adjacent the said opposite end of the rod for maintaining the engaging means on said seat.

11. In a wiper arm mounting for windshield cleaners having a shaft provided with a bearing and a seat, the latter being between the bearing and the windshield, a wiper carrying arm provided with a seat engaging part for hooking over the seat, a spring supporting part carried by the arm and disposed on the side of the shaft opposite the seat engaging part, a rod pivoted at one end in said bearing and extending through the spring supporting part, and spring means mounted about the rod and exerting pressure against said spring supporting part to thereby urge said seat engaging part to its seat and to urge the wiper carrying arm toward the windshield.

12. In a windshield cleaner the combination of a shaft provided with a part for engaging a spring device and a seat, a wiper carrying arm having a portion engaging the seat and means for engaging a spring device, a spring device under flexure engaging said part and said means, said portion being on such side of the shaft that the spring device will urge it against the seat, and said portion being offset relative to the force axis of the spring device whereby the spring device will urge the wiper carrying arm toward the windshield.

13. In a wiper arm mounting for windshield cleaners having a shaft provided with a seat, a wiper carrying arm detachably suspended from the seat and provided with a fixed spring support, and a spring device under compression between and engaging the spring support and the shaft for holding the arm against displacement from the shaft.

14. In a wiper arm mounting for windshield cleaners having a shaft, a wiper carrying arm suspended from said shaft and provided with a fixed seat, and a compressed spring device supported on the seat at one end thereof and acting at its opposite end against said shaft.

15. In a windshield cleaner, a shaft having a seat and means for engaging a spring device, a stirrup having a wiper arm secured thereto and supported thereby and having a portion bearing against said seat, a spring device having an end engaged with the engaging means of the shaft and the opposite end engaging the stirrup for holding said portion of the stirrup against said seat, the seat and the force axis of the spring device being so related that said spring device will urge angular movement of the stirrup and the wiper arm secured thereto about the seat toward the windshield.

16. In a wiper arm mounting for windshield cleaners having a shaft provided at its end with a bearing and a seat, an open elongated housing element with a front wall and side wall portions extending therefrom, the upper end of said housing element enclosing the end of said shaft and provided with engaging means for engaging said seat, a rod element mounted in said bearing and loosely extending downwardly through the lower end of said housing element whereby the rod element connects the shaft to the said housing element for unitary action, spring means within the housing element for maintaining said engaging means on said seat, and means for carrying a wiper blade connected to one of said elements.

17. In a wiper arm mounting for windshield cleaners having a shaft provided with a bearing and a seat, an elongated housing provided with wall portions, the upper end of the housing being provided with a seat engaging part engaging an upper surface of the shaft, a rod provided with a pintle portion for engaging said bearing, said rod having a spring engaging portion and an extension extending downwardly from the spring engaging portion between said wall portions and through the lower end of said housing, and spring means mounted about said rod extension and compressed between said spring engaging portion and the lower end of the housing, said wall portion of said housing enclosing the end of the shaft to prevent accidental displacement of the pintle therefrom.

18. In a wiper arm mounting for windshield cleaners having a shaft member provided with a bearing and a seat, an elongated housing provided with a front wall and side wall portions extending therefrom, the upper end of the housing enclosing the end of the shaft and having means engaging said seat, a member connecting the housing to the shaft for movement therewith, and spring means within the housing for co-acting with said shaft and housing to urge the engaging means of the housing against said seat.

19. In a wiper arm mounting for windshield cleaners, a wiper shaft provided with a bearing and a seat, a rod member having a pintle portion engaging said bearing, a stirrup member having a part seated on said seat and another part engaged with a portion of the rod member remote from said pintle portion, said stirrup member having a side wall portion disposed adjacent said rod member for retaining the pintle portion against displacement from said bearing, and a wiper carried by one of said members.

20. In a windshield cleaner, a wiper shaft, a wiper blade, a wiper arm section connected to the blade, and a stirrup member attached to said arm section and connectible to the wiper shaft, said stirrup member having a restricted opening passing said arm section, one of said members having a plurality of recesses therealong, and the other of said members having a detent engageable with any one of said recesses, whereby said arm section may be adjusted longitudinally within said restricted opening.

21. In a windshield cleaner wiper arm assembly for attachment to a wiper shaft, a member extending radially from the shaft and engaging one end of said shaft for movement with the shaft about the axis of the latter, and a casing engaging said member, said casing having front, side, and upper walls housing the shaft engaging of said member and said end of the shaft.

22. In a windshield cleaner wiper arm assembly for attachment to a wiper shaft having a transverse opening therein, a member extending radially from the shaft and having a part engaging said opening for fixing the member to the shaft for movement about the axis of the latter, and a casing having front, side, and upper walls housing the upper portion of said member and the portion of the shaft engaged with the member, whereby said casing may prevent accidental displacement of said part from said opening in the shaft.

23. In a windshield cleaner, a wiper shaft having a transverse bearing opening, a casing member of elongated form having a front wall adjacent the end of the shaft, and upper and side walls extending over and housing the end portion of the shaft and said bearing opening, a wiper arm having its upper portion connected to the lower portion of the elongated casing member and having its lower end adapted for carrying a wiper blade, a rod disposed substantially within the confines of the casing member and extending through the transverse bearing opening and extending into an opening in a wall of the casing member, whereby the housing and wiper arm and wiper blade are held against angular movement relative to the wiper shaft about the axis of the latter.

HENRY HUEBER.

CERTIFICATE OF CORRECTION.

Patent No. 1,920,145.　　　　　　　　　　　　　　　　　　　July 25, 1933.

HENRY HUEBER.

It is hereby certified that error appears in the printed specification of the above numbered patent requiring correction as follows: Page 4, line 110, claim 21, after "engaging" insert the word "portion"; and that the said Letters Patent should be read with this correction therein that the same may conform to the record of the case in the Patent Office.

Signed and sealed this 22nd day of August, A. D. 1933.

(Seal)　　　　　　　　　　　　　　　　　　　　M. J. Moore,
　　　　　　　　　　　　　　　　　　　　Acting Commissioner of Patents.

said bearing opening, a wiper arm having its upper portion connected to the lower portion of the elongated casing member and having its lower end adapted for carrying a wiper blade, a rod disposed substantially within the confines of the casing member and extending through the transverse bearing opening and extending into an opening in a wall of the casing member, whereby the housing and wiper arm and wiper blade are held against angular movement relative to the wiper shaft about the axis of the latter.

HENRY HUEBER.

CERTIFICATE OF CORRECTION.

Patent No. 1,920,145.  July 25, 1933.

HENRY HUEBER.

It is hereby certified that error appears in the printed specification of the above numbered patent requiring correction as follows: Page 4, line 110, claim 21, after "engaging" insert the word "portion"; and that the said Letters Patent should be read with this correction therein that the same may conform to the record of the case in the Patent Office.

Signed and sealed this 22nd day of August, A. D. 1933.

(Seal)  M. J. Moore,
Acting Commissioner of Patents.

CERTIFICATE OF CORRECTION.

Patent No. 1,920,145.  July 25, 1933.

HENRY HUEBER.

It is hereby certified that error appears in the printed specification of the above numbered patent requiring correction as follows: Page 4, line 110, claim 21, after "engaging" insert the word "portion"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.